United States Patent [19]

Gery

[11] Patent Number: 5,381,347
[45] Date of Patent: Jan. 10, 1995

[54] METHOD AND SYSTEM FOR DISPLAYING IMAGES ON A DISPLAY DEVICE USING AN OFFSCREEN VIDEO MEMORY

[75] Inventor: Ron O. Gery, Kirkland, Wash.

[73] Assignee: Microsoft Corporation, Redmond, Wash.

[21] Appl. No.: 993,410

[22] Filed: Dec. 21, 1992

[51] Int. Cl.⁶ ............................................. G06K 15/00
[52] U.S. Cl. .................................... 364/514; 395/163;
                                    395/165; 395/114; 364/131
[58] Field of Search ................. 364/514, 131; 395/164,
                                    395/163, 165, 114; 340/747

[56] References Cited

U.S. PATENT DOCUMENTS

| | | | |
|---|---|---|---|
| 4,349,918 | 9/1982 | Gordon | 364/514 |
| 4,379,950 | 4/1983 | Ahmed | 364/514 |
| 5,020,003 | 5/1991 | Mosheyberg | 395/164 |
| 5,185,599 | 2/1993 | Dourniuk et al. | 340/747 |

*Primary Examiner*—Emanuel T. Voeltz
*Assistant Examiner*—Thomas Peeso
*Attorney, Agent, or Firm*—Seed and Berry

[57] ABSTRACT

A user invokes an application program and initiates a request to display an image on a display device. In response, a display device driver creates a bitmap in an offscreen video memory of an adapter card. The display device driver then writes data corresponding to the requested image to the bitmap. At an appropriate time, the display device driver copies the bitmap from the offscreen video memory to an onscreen video memory of the adapter card over an adapter bus. The requested image is then displayed on the display device using the bitmap stored in the onscreen video memory.

11 Claims, 9 Drawing Sheets

METHOD AND SYSTEM FOR DISPLAYING IMAGES ON A DISPLAY DEVICE USING AN OFFSCREEN VIDEO MEMORY

TECHNICAL FIELD

This invention relates generally to a computer method and system for displaying images on a display device, and more specifically, to a computer method and system for displaying images on the display device using an offscreen video memory.

BACKGROUND OF THE INVENTION

While computer systems currently provide for displaying images on a display device, it is generally acknowledged that increasing the speed with which computer systems display images is desirable. An example will help illustrate prior methods and systems for displaying images.

The System

FIG. 1 is a block diagram of a prior art system 100 comprising a computer 101, a keyboard and mouse 102, and a display device 103, for displaying images.

The computer 101 includes an input/output device 104, a central processing unit (CPU) 105, a system memory 106, and a video adapter 107. The adapter 107 is a printed circuit board (also called an interface card) that enables the computer 101 to use the display device 103. In the absence of the adapter 107 the computer 101 would be unable to use the display device 103 because the computer would not contain the necessary connections for such use. The adapter 107 contains its own video memory 108 which stores a bitmap 109 being displayed on the display device 103, a video processor unit 110 which transfers data to and within the video memory 108 over a video processor memory bus 111, a display device controller 112 which controls both the retrieval of data from the video memory 108 and the display of the retrieved data on the display device 103, and a display device bus 113 which transfers data from the video memory 108 to the display device controller 112. The adapter 107 is connected to the CPU 105 via a communications bus 114 which transfers data among components of the computer 101 over a set of hardware lines. Typical communication buses are designed in accordance with the Industry Standard Architecture (ISA), the Extended Industry Standard Architecture (EISA) or the Micro Channel Architecture (MCA).

The system memory 106 stores an application program 115, a bitmap 116, a suspended queue 117, an active queue 118, and an operating system 119. The operating system 119 is a software program responsible for controlling the allocation and usage of hardware resources such as display device 103 and central processing unit 105. A graphics display manager 120 and a display driver 121 of the operating system 119 are software programs which control the allocation and usage of the display device 103. An intermediate level scheduler 122 and a dispatcher 123 are software programs which control the allocation and usage of the CPU 105. The intermediate level scheduler 122 stores job requests actively competing for execution by the CPU 105, in the active queue 118. The intermediate level scheduler 122 stores job requests temporarily suspended from competing for execution by the CPU 105, in the suspended queue 117. The dispatcher 123 assigns priorities to the job requests in the active queue 118, assigns the CPU 105 to the highest priority job request, and provides an interrupt clock 124 with an interrupt time interval. As the highest priority job request executes on the CPU 105, the interrupt clock 124 decrements the interrupt time interval. When the interrupt time interval reaches zero, the interrupt clock 124 sends an interrupt signal to the CPU 105 to interrupt the execution of the CPU 105. The intermediate level scheduler 122 then places the executing job request back on the active queue 118 while the dispatcher 123 reprioritizes the job requests on the active queue 118, and initiates execution of the highest priority job request.

General Operation

Typically, a user of the application program 115 initiates a request to create an image on the display device 103. The application program 115 sends a CreateImage job request to the graphics display manager 120. The graphics display manager 120 creates the bitmap 116 in the system memory 106. The graphics display manager 120 then initializes the bitmap 116 and sends an identifier to the bitmap 116 back to the application program 115.

Then the application program 115 sends a WriteToBitmap request, along with the identifier to the bitmap 116, to the graphics display manager 120. The graphics display manager 120 sends the WriteToBitmap request, along with the identifier to the bitmap 116, to the display driver 121. Display driver 121 writes image data corresponding to the requested image to the bitmap 116. Meanwhile, the adapter 107 displays an image on the display device 103 using data previously stored in the video memory 108.

Periodically, the video memory 108 must be updated to ensure that any changes made to the bitmap 116 are also made to the image displayed on the display device 103. When the graphics display manager 120 determines that it is an appropriate time to update the video memory 108, the graphics display manager 120 sends an UpdateVideoMemory request to the display driver 121. The display driver 121 retrieves the bitmap 116 from the system memory 106 and sends the bitmap 116, along with a StoreBitmap request, over the communications bus 114 to the video processor unit 110. The video processor unit 110 executes the StoreBitmap request by transferring the received bitmap 116 over the video processor memory bus 111 to the video memory 108 where it is stored as the new bitmap 109. The display device controller 112 then displays the requested image on the display device 103 using the bitmap 109 from the video memory 108.

Because the CPU 105 is not solely dedicated to the task of displaying images on the display device 103, the operating system 119 must schedule such job requests among job requests from other tasks. For example, for the display driver 121 to send the bitmap 116 over the communications bus 114, the display driver 121 first sends a request to the intermediate level scheduler 122 to both gain access to the communications bus 114 and to transfer the bitmap 116 over the communications bus 114 to the video memory 108 ("the transfer bitmap request"). If the system work load is not heavy, then the intermediate level scheduler 122 places the transfer bitmap request in the active queue 118 where it competes with other job requests for access to the CPU 105. The dispatcher 123 prioritizes the job requests in the active queue 118. When the transfer bitmap request becomes the highest priority job request in the active queue 118, the dispatcher 123 sets an interrupt time interval for the interval clock 124 and assigns the CPU to execute the transfer bitmap request. The CPU 105 executes the transfer bitmap request until the expiration of the interrupt time interval, at which point it receives an interrupt signal from the interrupt clock 124. The intermediate level scheduler 122 then determines, based on system work load, whether the transfer bitmap request should be stored in the suspended queue 117 or the active queue 118. If the transferred bitmap request is placed on the suspended queue 117, then the intermediate level scheduler 122 monitors the system work load and stores the transfer bitmap request in the active queue 118 after the system work load falls below a threshold level of activity. Once the transfer bitmap request is stored in the active queue 118, the dispatcher 123 reprioritizes the job requests in the active queue 118, allocates the CPU 105 to the highest priority job request in the active queue 118, and sets an interrupt time interval for the interrupt clock 124. Eventually, the transfer bitmap request is executed by the CPU 105 for a sufficient time to complete the bitmap transfer.

It is desirable to increase the speed at which images can be displayed on the display device 103 over the speed achievable with the above-described prior art system 100.

SUMMARY OF THE INVENTION

It is an object of the present invention to provide a method and system for displaying images on a display device more quickly than prior systems.

Another object of the invention is to provide a method and system for displaying data on the display device while using less system memory than prior systems.

These and other objects, which will be apparent as the invention is more fully described, are provided by a method and system for displaying images on the display device. In a preferred embodiment of the present invention, a user invokes an application program and initiates a request to display an image. In response to the user request, a graphics display manager creates a bitmap directly in an offscreen video memory of an adapter. At an appropriate time, the graphics display manager invokes a display device driver to copy the bitmap from the offscreen video memory to an onscreen video memory of the adapter. The requested image is then displayed on the display device using the bitmap in the onscreen video memory.

DETAILED DESCRIPTION OF THE INVENTION

Figure 2:
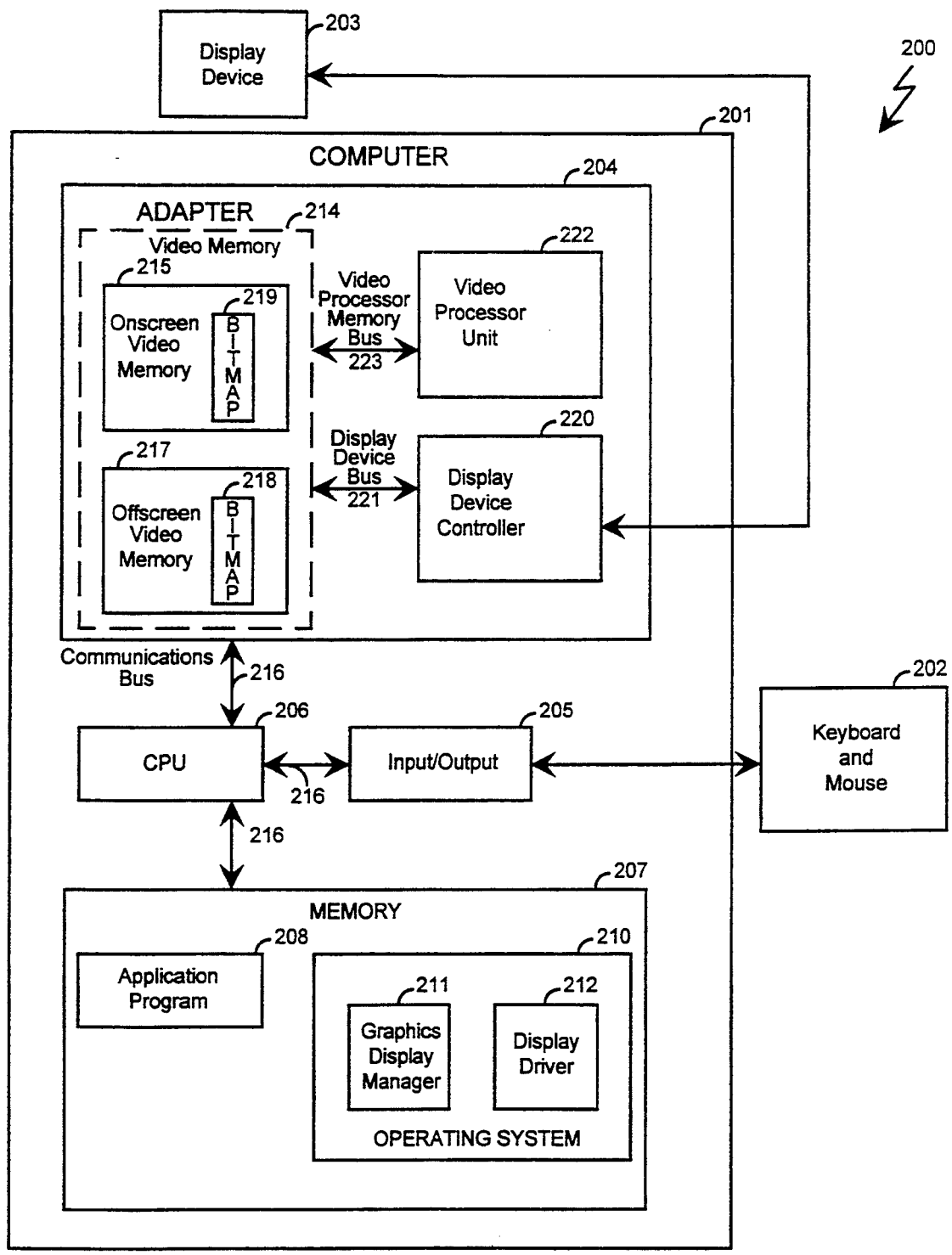
FIG. 2 is a block diagram of a system embodying the present invention for displaying images on a display device.

As shown in FIG. 2, the present invention is embodied in a computer system 200 and a method executed in the computer system 200 for displaying images on a display device 203 using an offscreen video memory 217.

The System

The computer 201 comprises an input output device 205, a central processing unit (CPU) 206, a system memory 207, and a conventional video adapter 204.

The adapter 204 is a printed circuit board (also called an interface card) that enables the computer 201 to use the display device 203. For example, the ATI Graphics Ultra Video Card can be used to implement adapter 204. The adapter 204 contains its own video memory 214, which includes an onscreen video memory 215 and the offscreen video memory 217 which store bitmaps intended for display on the display device 203. The adapter 204 also includes a display device controller 220, a display device bus 221, a video processor unit 222, and a video processor memory bus 223. The display device controller 220 retrieves video data from the onscreen video memory 215 and displays the retrieved data on the display device 203. The display device controller 220 retrieves data from the onscreen video memory 215 over the display device bus 221. The video processor unit 222 is a processor dedicated solely to transferring data to and within the video memory 214 and therefore has less job requests competing for execution by it than the CPU 206. The video processor unit 222 also operates at a higher clock rate than the CPU 206. The video processor unit 222 transfers data to the video memory 214 over the video processor memory bus 223 which is solely dedicated to supporting data transfers to and within video memory. The adapter 204 is connected to the CPU 206 via a communications bus 216 which transfers data among components of the computer 201 over a set of hardware lines. The communication buses may be designed in accordance with the Industry Standard Architecture (ISA), the Extended Industry Standard Architecture (EISA) or the Micro Channel Architecture (MCA).

The system memory 207 comprises an application program 208 and an operating system 210, including a graphics display manager 211 and a display driver 212. The operating system 210 is a software program responsible for controlling the allocation and usage of hardware resources such as system memory 207, CPU 206, and display device 203. The graphics display manager 211 and the display driver 212 of the operating system 210 are software programs which control the allocation and usage of the display device 203. An example of the general operation of the system 200 (FIG. 2) will help illustrate how the present invention displays images on the display device 203 using the offscreen video memory 217.

General Operation

Initially, the user launches the application program 208 and initiates a request to create an image on the display device 203. The application program 208 sends a CreateBitmap request to the graphics display manager 211. The graphics display manager 211 sends the CreateBitmap request to the display driver 212. The display driver 212 creates and initializes a bitmap 218 directly in the offscreen video memory 217 of the adapter 204 (i.e., without creating the bitmap in the system memory 207) using a CreateBitmap method, as will be described in greater detail below with respect to FIG. 4.

Upon completion of the CreateBitmap method, the display driver 212 sends an identifier to the bitmap 218 to the graphics display manager 211 which forwards the identifier to the application program 208. The application program 208 sends a WriteToBitmap request to the graphics display manager 211. The graphics display manager 211 sends the WriteToBitmap request, along with the identifier to the bitmap 218, to the display driver 212. The display driver 212 writes image data corresponding to the requested image to the bitmap 218 in the offscreen video memory 217 using a WriteToBitmap method, as will be described in greater detail below with respect to FIG. 5.

Meanwhile, the adapter 204 displays an image on the display device 203 using data previously stored as a bitmap 219 in the onscreen video memory 215. At an appropriate time, the onscreen video memory 215 must be updated with the bitmap 218 in the offscreen video memory 217 to ensure that any changes made to the bitmap 218 in the offscreen video memory 217 will also be made to the image displayed on the display device 203. The conditions upon which the update occurs are application dependent. Next, the graphics display manager 211 sends a CopyBitmap request to the display driver 212. The display driver 212 sends the CopyBitmap request to the video processor unit 222. The video processor unit 222 performs the CopyBitmap request using a CopyBitmap method, as will be described in greater detail below with respect to FIG. 6, to thereby copy the bitmap 218 from the offscreen video memory 217 to the onscreen video memory 215 over the video processor memory bus 223, where it is stored as a new bitmap 219. At an appropriate time, the display device controller 220 updates the display device 203 with the bitmap 219 stored in the onscreen video memory 215.

The system and method of the present invention provide advantages over prior art systems and methods. For example, less computer memory is required because the present system and method stores bitmaps in the offscreen video memory 217 instead of in system memory 207.

The present system and method also updates the onscreen video memory 215 with new image data more quickly than existing systems and methods.

Figure 1:
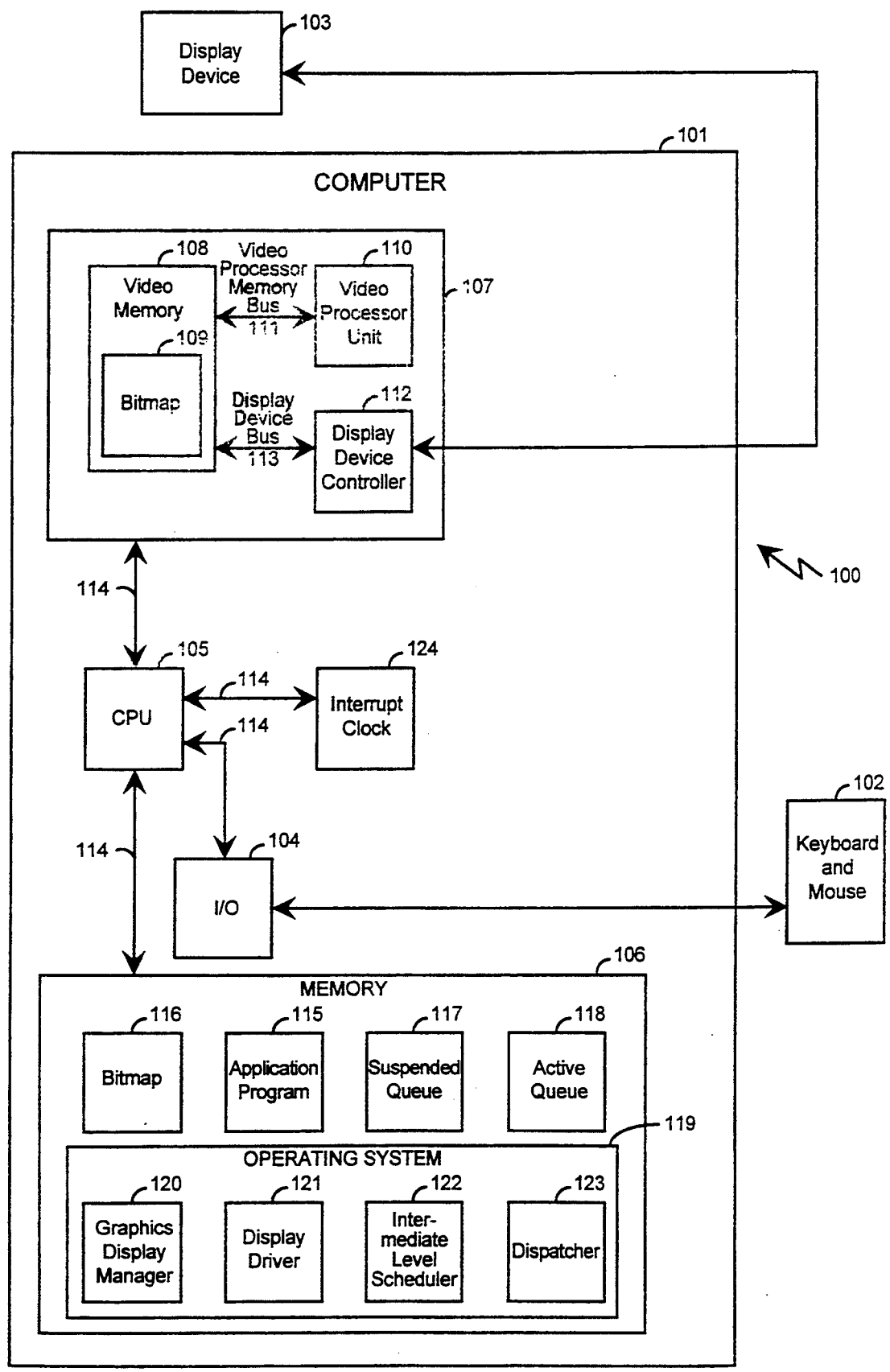
FIG. 1 is a block diagram showing a prior art system for displaying images on a display device.

First, a request to transfer the bitmap 218 from the offscreen video memory 217 to the onscreen video memory 215 gains access to the video processor unit 222 more quickly than a request to transfer the bitmap 109 (FIG. 1) from the system memory 107 to the adapter video memory 114 gains access to the CPU 105. The video processor unit 222 is a dedicated processor which merely awaits transfer bitmap requests. The CPU 105 (FIG. 1) performs all other requests for the computer 101. Therefore, while the operating system 110 (FIG. 1) places the transfer bitmap request in the suspended queue 123 or the active queue 124 and schedules the transfer bitmap request for future execution on the CPU 105, the transfer bitmap request of the present invention immediately begins execution on the video processor unit 222.

Second, the video processor unit 222 executes at a higher clock rate than the central processor unit 105. Therefore, the transfer bitmap request of the present invention completes execution on the video processor unit 222 more quickly than a similar request would complete execution on CPU 105.

Third, the video processor memory bus 223 is a dedicated communications bus which merely awaits data transfers to and within the video memory 214. The communications bus 114 (FIG. 1) is used by the CPU 105 to transfer data among all other components in the computer 101. Therefore, the transfer bitmap request of the present invention will generally gain access to the video processor memory bus 223 more quickly than the transfer bitmap request will gain access to the communications bus 114.

For at least these reasons the present invention transfers the bitmap 218 from the offscreen video memory 217 to the onscreen video memory 215 more quickly than prior methods copied the bitmap 109 from the system memory 107 to the video memory 114.

Flow Diagrams

Figure 3:
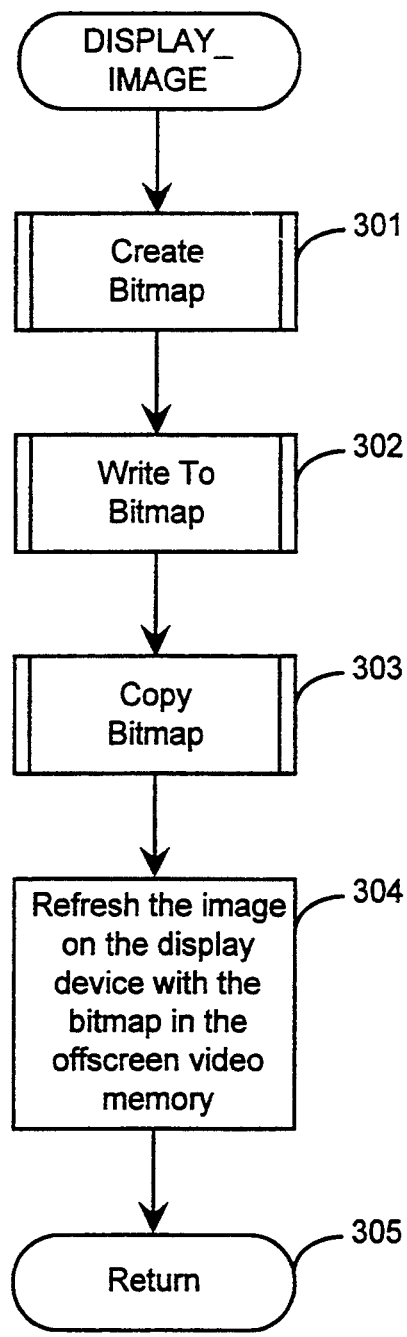
FIG. 3 is a flow diagram of the function DisplayImage for the system of FIG. 2.

FIG. 3 is a flow diagram of the function DisplayImage for displaying images on the display device 203 using the offscreen video memory 217. In step 301 the function DisplayImage invokes the function CreateBitmap (See FIG. 4) which creates and initializes the bitmap 218 in the offscreen video memory 217 (FIG. 2). In step 302 the function WriteToBitmap (see FIG. 5) is invoked, which writes an image to the bitmap 218 from the offscreen video memory 217. In step 303 the function DisplayImage invokes the function CopyBitmap (see FIG. 6), which copies the bitmap 218 from the offscreen video memory 217 to the onscreen video memory 215. In step 304 the function DisplayImage updates the display device 203 using the bitmap 219 in the onscreen video memory 215. Any well-known technique in the art for refreshing the image on the display device can be used to implement this aspect of the method. Upon completion of step 304 the function DisplayImage returns to the application program 208.

Figure 4:
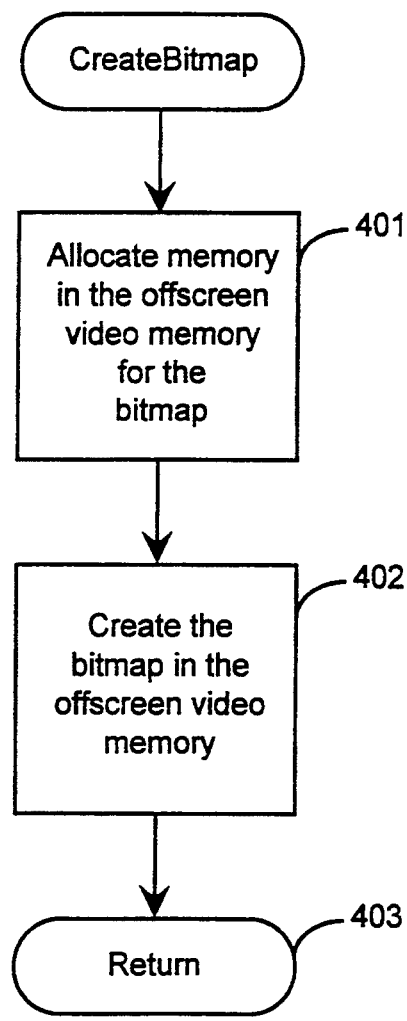
FIG. 4 is a flow diagram of the function CreateBitmap for the system of FIG. 2.

FIG. 4 is a flow diagram of the function CreateBitmap, preferably performed by the display driver 212 (FIG. 2), which creates the bitmap 218 in the offscreen video memory 217. In step 401, the function CreateBitmap allocates memory in the offscreen video memory 217 for the bitmap 218. In step 402, the function creates the bitmap 218 in the allocated portion of the offscreen video memory 217. Upon completion of step 402, the function CreateBitmap returns to the function DisplayImage (FIG. 3).

Figure 5:
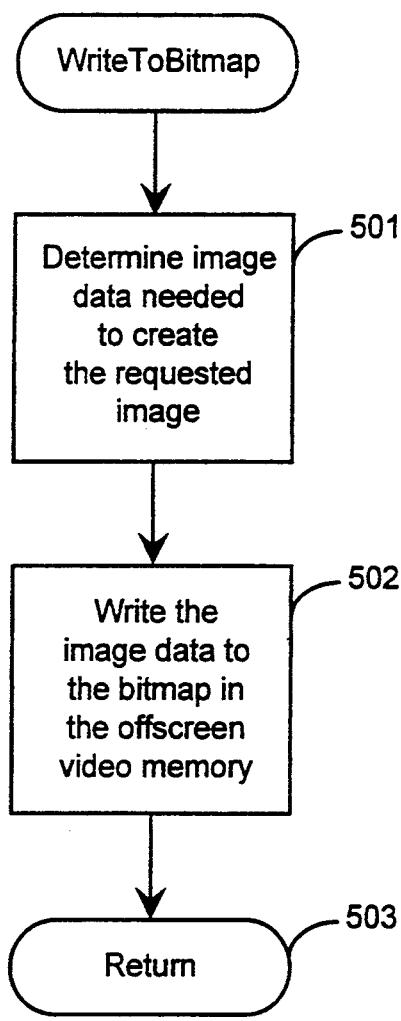
FIG. 5 is a flow diagram of the function WriteToBitmap for the system of FIG. 2.

FIG. 5 is a flow diagram of the function WriteToBitmap, preferably performed by the display driver 212 (FIG. 2), which writes image data to the bitmap 218 in the offscreen video memory 217. The image data corresponds to the image requested by the user of the computer system 200. In step 501, the function determines the image data needed to create the requested image. In step 502, the function writes the image data to the bitmap in the offscreen video memory. Upon completion of step 502, the function WriteToBitmap returns to the function DisplayImage (FIG. 3).

Figure 6:
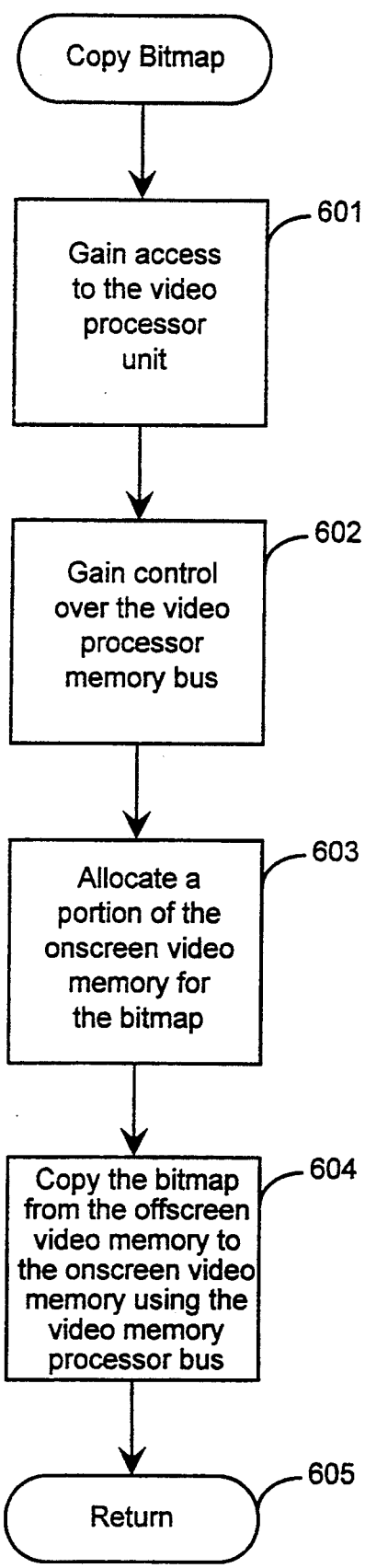
FIG. 6 is a flow diagram of the function CopyBitmap for the system of FIG. 2.

FIG. 6 is a flow diagram of the function CopyBitmap which updates the onscreen video memory 215 (FIG. 2) by copying the bitmap 218 from the offscreen video memory 217 to the onscreen video memory 215. In step 601, the function CopyBitmap gains access to the video processor unit 222. In step 602, the function CopyBitmap gains control over the video processor memory bus 223. In step 603, the function allocates a portion of the onscreen video memory 215 in which to copy the bitmap 218 from the offscreen video memory 217. In step 604, the function copies the bitmap 218 from the offscreen video memory 217 to the onscreen video memory 215 over the video processor memory bus 223. Upon completion of step 604, the function CopyBitmap returns to the function DisplayImage (FIG. 3).

Specific Example

A specific example of the operation of the system 200 (FIG. 2) will help illustrate how the present invention displays an image of a rectangle on the display device 203 using the offscreen video memory 217. For purposes of this example, the application program 208 is any well-known drawing program.

Initially, the user launches a drawing program 208 and initiates a request to create a rectangle on the display device 203. The drawing program 208 sends a CreateBitmap request to a graphics display manager 211. The graphics display manager 211 sends the CreateBitmap request to a display driver 212. The display driver 212 creates a bitmap 218 directly in an offscreen video memory 217 without creating the bitmap 218 in the system memory 207.

Figure 7:
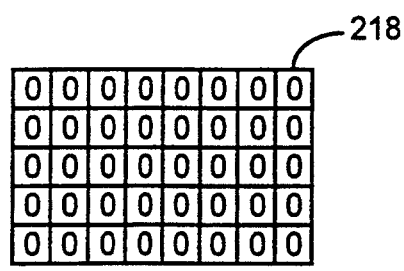
FIG. 7 Is a block diagram of an initialized bitmap used in the system of FIG. 2 to display a rectangle on the display device.

FIG. 7 is a block diagram of the initialized bitmap 218 in the offscreen video memory 217.

Upon completion of the CreateBitmap method, the display driver 212 sends an identifier to the bitmap 218 to the graphics display manager 211 which forwards the identifier to the drawing program 208. The drawing program 208 sends a WriteRectangle request to the graphics display manager 211. The graphics display manager 211 sends the WriteRectangle request, along with the identifier to the bitmap 218, to the display driver 212. The display driver 212 sends the WriteRectangle request along with image data corresponding to the requested rectangle to the video processor unit 222. The video processor unit 222 executes the WriteRectangle request and thereby stores the image data in the bitmap 218 in the offscreen video memory 217.

Figure 8:
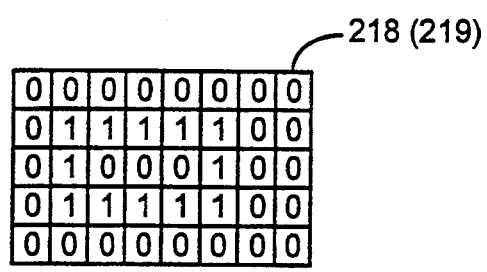
FIG. 8 is a block diagram of the bitmap of FIG. 7 as it stores data corresponding to the rectangle.

FIG. 8 is a block diagram of the bitmap 218 after the image data corresponding to the requested rectangle has been written to the bitmap 218.

Figure 9:
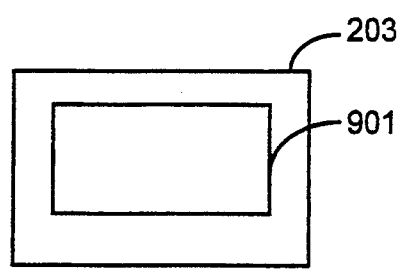
FIG. 9 is a block diagram of the rectangle displayed on the display device of FIG. 2.

Meanwhile, the adapter 204 displays an image on the display device 203 using data previously stored in the offscreen video memory 217. Periodically, the onscreen video memory 215 must be updated with the bitmap 218 in the offscreen video memory 217 to ensure that any changes made to the bitmap 218 in the offscreen video memory 217 will also be made to the image displayed on the display device 203. Therefore, the application program 208 sends a CopyBitmap request to the graphics display manager 211. The graphics display manager 211 sends the CopyBitmap request to the display driver 212, which sends the CopyBitmap request to the video processor unit 222. The video processor unit 222 immediately executes the CopyBitmap request and thereby transfers the bitmap 218, containing the image of the rectangle, from the offscreen video memory 218, over the video processor memory bus 223 to the onscreen video memory 214. At an appropriate time, the display device controller 220 updates the display device 203 with the bitmap 219 stored in the onscreen video memory 215. FIG. 9 illustrates the requested rectangle 901 displayed on the display device 203.

Those of ordinary skill in the art will understand that other system architectures can be used to implement the methods of the present invention described above, including, but not limited to, a local area network in which several computers are coupled with file servers to share access to data among computer users through a data communications network.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. A method executed in a computer system for displaying images on a display device, the computer system including a central processor, a system memory, and a system bus, the method comprising the steps of:

providing an adapter allowing the computer to communicate with the display device, the adapter including an offscreen video memory and an onscreen video memory separate from the system memory, and a dedicated video processor separate from the central processor, and an adapter bus separate from the system bus;

sending a create bitmap command to the central processor for creating a bitmap directly in the offscreen video memory without creating the bitmap in the system memory;

executing the create bitmap command in the central processor to create the bitmap directly in the offscreen video memory without creating the bitmap in the system memory;

sending a copy bitmap command to the dedicated video processor for copying the bitmap directly from the offscreen video memory to the onscreen video memory;

executing the copy bitmap command in the dedicated video processor to copy the bitmap directly from the offscreen video memory to the onscreen video memory over the adapter bus, without first copying the bitmap to the system memory; and displaying the bitmap in the onscreen video memory on the display device.

2. The method of claim 1 wherein the system memory includes a display driver and wherein the step of sending the create bitmap command includes the step of initiating the create bitmap command using the display driver.

3. A method executed in a computer system for displaying images on a display screen of a display device, the computer system including a central processor, a system memory, and a system bus, the method comprising the steps of:

providing an adapter on the computer so that the computer can communicate with the display device, the adapter including an offscreen video memory and an onscreen video memory separate from the system memory;

creating a bitmap directly in the offscreen video memory;

copying the bitmap directly from the offscreen video memory to the onscreen video memory, without first copying the bitmap to the system memory; and displaying the bitmap on the display screen of the display device in response to the step of copying the bitmap to the onscreen video memory.

4. The method of claim 3 wherein the step of copying the bitmap from the offscreen video memory to onscreen video memory includes the step of sending the bitmap over a dedicated video processor bus, the dedicated video processor bus being separate from the system bus.

5. A method executed in a computer system for displaying images on a display screen of a display device, the computer system comprising a computer, a central processor, a system memory, a system bus, and an adapter allowing the computer to communicate with the display device, the adapter including an offscreen video memory separate from the system memory and an onscreen video memory separate from the system memory, and a dedicated video processor separate from the central processor, and an adapter bus separate from the system bus, the method comprising the steps of:

sending a create bitmap command to the central processor for creating a bitmap directly in the offscreen video memory without creating the bitmap in the system memory;

executing the create bitmap command in the central processor to create the bitmap directly in the offscreen video memory without creating the bitmap in the system memory;

sending a copy bitmap command to the dedicated video processor for copying the bitmap from the offscreen video memory to the onscreen video memory;

executing the copy bitmap command in the dedicated video processor to copy the bitmap directly from the offscreen video memory to the onscreen video memory over the adapter bus, without first copying the bitmap to the system memory; and displaying the bitmap in the onscreen video memory on the display screen of the display device.

6. A method executed in a computer system for displaying images on a display screen of a display device, the computer system comprising a computer, a system memory, and an adapter so that the computer can communicate with the display device, the adapter including an offscreen video memory separate from the system memory and an onscreen video memory separate from the system memory, the method comprising the steps of:

creating a bitmap directly in the offscreen video memory;

copying the bitmap directly from the offscreen video memory to the onscreen video memory, without first copying the bitmap to the system memory; and displaying the bitmap on the display screen of the display device in response to the step of copying the bitmap to the onscreen video memory.

7. A computer system for displaying images on a display device, the computer system including a system memory, a central processor, and a system bus, the system comprising:

an adapter to enable the computer to use the display device, the adapter including an offscreen video memory separate from the system memory and an onscreen video memory separate from the system memory for storing bitmaps to be displayed on the display device;

means for receiving a request to display an image on the display device;

means for creating a bitmap of the requested image directly in the offscreen video memory;

means for updating the onscreen video memory by copying the bitmap directly from the offscreen video memory to the onscreen video memory, without first copying the bitmap to the system memory; and means for displaying the requested image on the display device using the bitmap stored in the onscreen video memory.

8. The system of claim 7 wherein the means for updating the onscreen video memory includes means for sending the bitmap over a dedicated adapter bus.

9. A computer system for displaying images on a display device, the computer system including a central processor, a system memory, and a system bus, the system comprising:

an adapter allowing the computer to communicate with the display device, the adapter including an offscreen video memory separate from the system memory and an onscreen video memory separate from the system memory, and a dedicated video processor separate from the central processor, and an adapter bus separate from the system bus;

means for sending a create bitmap command to the central processor for creating a bitmap in the offscreen video memory;

means for executing the create bitmap command in the central processor to create the bitmap directly in the offscreen video memory without creating the bitmap in the system memory;

means for sending a copy bitmap command to the video processor for copying the bitmap from the offscreen video memory to the onscreen video memory;

means for executing the copy bitmap command in the dedicated video processor to copy the bitmap directly from the offscreen video memory to the onscreen video memory over the adapter bus, without first copying the bitmap to the system memory; and means for displaying the bitmap in the onscreen video memory on the display device.

10. A computer system for displaying images on a display screen of a display device, the computer system comprising a computer, a system memory, a system bus, and an adapter allowing the computer to communicate with the display device, the adapter including an offscreen video memory separate from the system memory and an onscreen video memory separate from the system memory, and a dedicated video processor separate from the central processor, and an adapter bus separate from the system bus, the system comprising:

means for sending a create bitmap command to the central processor for creating a bitmap in the offscreen video memory;

means for executing the create bitmap command in the central processor to create the bitmap directly in the offscreen video memory without creating the bitmap in the system memory;

means for sending a copy bitmap command to the video processor for copying the bitmap from the offscreen video memory to the onscreen video memory;

means for executing the copy bitmap command in the dedicated video processor to copy the bitmap directly from the offscreen video memory to the onscreen video memory over the adapter bus, without first copying the bitmap to the system memory; and means for displaying the bitmap in the onscreen video memory on the display device.

11. A computer system for displaying images on a display screen of a display device, the computer system comprising a computer, a system memory, a system bus, and an adapter so that the computer can communicate with the display device, the adapter including an offscreen video memory separate from the system memory and an onscreen video memory separate from the system memory, and a dedicated video processor separate from the central processor, and an adapter bus separate from the system bus, the system comprising:

means for creating a bitmap directly in the offscreen video memory;

means for copying the bitmap directly from the offscreen video memory to the onscreen video memory, without first copying the bitmap to the system memory; and means for displaying the bitmap on the display device in response to the step of copying the bitmap to the onscreen video memory.

* * * * *